United States Patent [19]
Kimura

[11] Patent Number: 5,835,699
[45] Date of Patent: Nov. 10, 1998

[54] BREAKPOINT SETTING/DELETING SYSTEM USING A SYMBOLIC DEBUGGER IN A DIGITAL DATA PROCESSING SYSTEM

[75] Inventor: Eiichi Kimura, Tokyo, Japan

[73] Assignee: NEC Corporation, Tokyo, Japan

[21] Appl. No.: 876,479

[22] Filed: Jun. 16, 1997

Related U.S. Application Data

[63] Continuation of Ser. No. 37,121, Mar. 25, 1993, abandoned.

[30] Foreign Application Priority Data

Mar. 25, 1992 [JP] Japan .................................. 4-097436

[51] Int. Cl.$^6$ ...................................................... G06F 11/00
[52] U.S. Cl. ........................................ 395/183.1; 395/704
[58] Field of Search ........................... 395/183.1, 183.11, 395/183.21, 704, 183.01, 701

[56] References Cited

U.S. PATENT DOCUMENTS

| | | | |
|---|---|---|---|
| 5,038,348 | 8/1991 | Yoda et al. ................................ | 371/19 |
| 5,093,914 | 3/1992 | Coplien et al. ........................... | 395/700 |
| 5,175,856 | 12/1992 | Van Dyke et al. ....................... | 395/700 |
| 5,265,254 | 11/1993 | Blasciak et al. .......................... | 395/700 |
| 5,278,986 | 1/1994 | Jourdenais et al. ...................... | 395/700 |
| 5,560,009 | 9/1996 | Lenkov et al. ............................ | 395/704 |

OTHER PUBLICATIONS

"The Annotated C + + Reference Manual", M. Ellis et al., AT&T Bell Telephon Laboratories, Incorporated, 1990, pp. 121–127.

"EWS–UX/V (Rel 4.0) Programmer's Guide: Compiler System and Debugging", Chapter 5.8, pp. 5–41 et seq., 1991, NEC Corporation.

"EUS–UX/V Program Development Support Tools", Section 6, 1990, NEC Corporation.

*Primary Examiner*—Albert Decady
*Attorney, Agent, or Firm*—Foley & Lardner

[57] ABSTRACT

A breakpoint setting/deleting system is disclosed. Encoded function names are first retrieved from a given executable file which has been stored in a memory. A decoder is supplied with the retrieved encoded function names and then decodes same into corresponding source-level function names and signatures thereof. Subsequently, a function name lookup table is generated which shows a relationship between the encoded function names and the decoded source-level function names and signature thereof. A breakpoint setting/deleting instruction, which is applied to the system, includes a source-level function name and a signature thereof to which a breakpoint is to be set. A set of the source-level function name and the signature thereof, which are included in the breakpoint setting/deleting instruction, is used to retrieve the corresponding encoded function name from the function name lookup table. Thereafter, a breakpoint in set to the encoded function name obtained from the lookup table.

8 Claims, 2 Drawing Sheets

FIG. 2

| ENCODED FUNCTION NAME INCLUDED IN EXECUTABLE FILE | FUNCTION NAME & SIGNATURE THEREOF BOTH DECODED | |
|---|---|---|
| | FUNCTION NAME | ARGUMENT |
| findpath__4PathFR4Path | Path::findpath | (Path&) |
| findpath__4PathFi | Path::findpath | (int) |
| findpath__4PathFRc | Path::findpath | (char&) |
| findpath__4PathFR4Pathi | Path::findpath | (Path&,int) |
| findpath__4PathFR4PathR6string | Path::findpath | (Path&,String&) |

BREAKPOINT SETTING/DELETING SYSTEM USING A SYMBOLIC DEBUGGER IN A DIGITAL DATA PROCESSING SYSTEM

This application is a continuation, of application Ser. No. 08/037,121, filed Mar. 25, 1993, now abandoned.

BACKGROUND OF THE INVENTION

1. Field of the Invention

The present invention relates generally to a breakpoint setting/deleting system and more specifically to such a system using a symbolic debugger. Still more specifically, the present invention is concerned with an object program which can be written using so-called "function overloading". According to the present invention, breakpoints can easily be set to (or deleted from) the encoded overloaded functions within an executable file as compared with prior art techniques.

2. Description of Related Art

As is well known in the art, a symbolic debugger allows symbolic representation of variables or locations.

On the other hand, the "overloading of functions" is now a common technique of providing type-safe linkage when a programing using the C++ language (for example). With "function overloading", a plurality of instances of functions with the same name appear in a source code. However, only one instance of a function with any given name should exist in an executable file. This can be done by encoding the signature of a function (its argument(s) for example) within the executable file.

The detailed explanation of the "overloading of functions" and the "type-safe linkage" is given in a book entitled "The Annotated C++ Reference Manual" by Margaret A. Ellis and Bjarne Stroustrup (AT&T Bell Telephone Laboratories, Incorporated, 1990), and thus further descriptions thereof will be omitted for the sake of brevity.

Further, as is well known, a breakpoint is a symbol inserted into a program which stops its execution at that point to allow registers, variables, memory locations, etc. to be examined. A breakpoint is used when debugging a program.

According to a known technique, when a programmer wishes to set breakpoints to (or delete same from) the overloaded functions which have been encoded into corresponding symbols and located in a executable file, the programmer must first know what symbols the original (viz., source-level) overloaded functions have been encoded into. Subsequently, the programmer enters the encoded function name to which a breakpoint is to be set (or from which a breakpoint is deleted).

Merely for the sake of simplifying the descriptions, only breakpoint setting may be referred to hereinafter.

In more specific terms, every time a programmer sets breakpoints to the functions in a source code (or source program), the programmer must identify the corresponding encoded function names. Since the overloaded functions in a source code (viz., source-level overloaded functions) are encoded into very similar or analogous function names, the programmer should always exercise considerable care that he or she does not make a mistake when entering the encoded function name using a console. Further, the above mentioned prior art problem is also liable to induce mistakes when the programmer checks the outputs of the console which indicate the breakpoints attached to the analogous encoded function names.

It is therefore highly desirable if a breakpoint can be set or deleted using source-level (viz., original) function names instead of the error-prone encoded function names.

SUMMARY OF THE INVENTION

In view of the above drawback it is an object of the present invention to provide breakpoint a setting/deleting system wherein a function name lookup table is generated such as to include the original overloaded function names and the corresponding encoded function names.

Another object of the present invention is to provide breakpoint setting/deleting system wherein a programmer can set breakpoints using an original function name.

In brief, the above objects are achieved by a breakpoint setting/deleting system wherein encoded function names are first retrieved from a given executable file which has bean stored in a memory. A decoder is supplied with the retrieved encoded function names and then decodes same into corresponding source-level function names and signatures thereof. Subsequently, a function name lookup table is generated which shows a relationship between the encoded function names and the decoded source-level function names and signature thereof. A breakpoint setting/deleting instruction, which is applied to the system, includes a source-level function name and a signature thereof to which a breakpoint is to be set. A set of the source-level function name and the signature thereof, which are included in the breakpoint setting/deleting instruction, is used to retrieve the corresponding encoded function name from the function name lookup table. Thereafter, a breakpoint is set to the encoded function name obtained from the lookup table.

More specifically an aspect of the present invention resides in a breakpoint setting/deleting system comprising: first means for retrieving encoded function names from a given executable file stored in a memory; second means arranged to receive the encoded function names from the first means and to decode the encoded function names into corresponding source-level function names and signatures thereof; third means arranged to receive the encoded function names and the source-level function names and signatures thereof, the third means generating a function name lookup table which shows a relationship between the encoded function names and the source-level function names and signature thereof; fourth means for decoding a breakpoint setting/deleting instruction which is applied thereto and which includes a source-level function name and a signature thereof to which a breakpoint is to be set; fifth means coupled to receive the breakpoint setting/deleting instruction which has been decoded by the fourth means, the fifth means retrieving an encoded function name specified by the source-level function name and signature thereof using the function name lookup table; and sixth means coupled to the fifth means, the sixth means setting/deleting a breakpoint to the encoded function name retrieved by the fifth means.

BRIEF DESCRIPTION OF THE DRAWINGS

The features and advantages of the present invention will become more clearly appreciated from the following description taken in conjunction with the accompanying drawings in which:

FIG. 2 is a function name lookup table which characterizes the present invention.

DETAILED DESCRIPTION OF THE PREFERRED EMBODIMENTS

Figure 1:
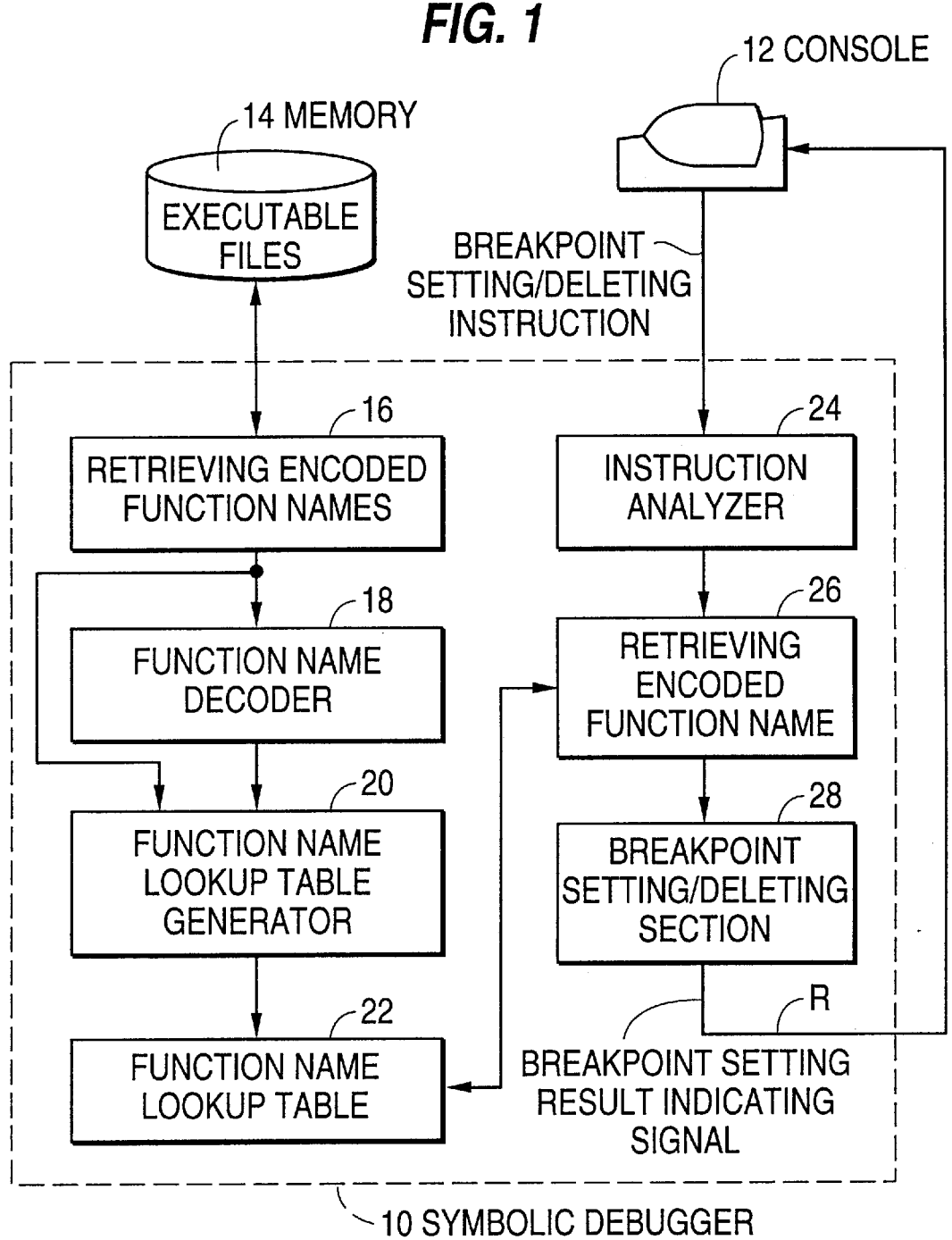
FIG. 1 is a block diagram showing a breakpoint setting/deleting system using a symbolic debugger according to the present invention.

A preferred embodiment of the present invention will be discussed with reference to FIGS. 1 and 2.

As shown in FIG. 1, a symbolic debugger 10 is provided such as to be associated or operatively coupled with a console 12 and a suitable memory 14 which includes a plurality of executable files.

Merely for the convenience of descriptions it in assumed that:

(a) source programs have been translated, using a suitable compiler, into corresponding executable files which are stored in the memory 14;

(b) a breakpoint setting/deleting program is now executed;

(c) a given executable file has been selected by the breakpoint setting/deleting program.

That is, a plurality of instances of functions with the same name in the source program have been encoded using the above-mentioned function overloading.

As mentioned in the opening paragraphs, only one instance of a function with any given name can appear in the executable file, and this can be done by encoding the signature of a function within the function name in the executable file.

When a given executable file is selected by the breakpoint setting/deleting program, the encoded function names included in the executable file are retrieved from the file (see block 16). Merely by way of example, five encoded function names retrieved from the selected executable file, are illustrated in FIG. 2. Following this, a decoder 18 decodes the encoded function names fed by a function name retrieving means 16. The decoded function names, which are listed in FIG. 2, exactly correspond to the original (viz., source-level) ones.

A generator 20 receives the decoded function names from the decoder 18 and the corresponding encoded function names from the retrieving means 16.

Thereafter, the generator 20 generates a function name lookup table which is shown in FIG. 2. More specifically, the table shows a relationship between the encoded function names retrieved from the executable file and the corresponding decoded function names accompanied by the signatures (arguments in the illustrated case) thereof. The lookup table thus generated is stored in a memory 22.

When a programmer wishes to set a breakpoint at a given function name in a source program, the programmer enters, using the console 12, the original (viz., source-level) function name plus its argument(s) into the symbolic debugger 10. It should be noted that according to the present invention, the programmer is not required to enter an encoded function name for the breakpoint setting or deleting as in the prior art.

An instruction analyzer 24 selects or detects the breakpoint setting/deleting instruction applied thereto. The selected instruction, which includes the original function name plus its argument(s), is then used to retrieve the corresponding encoded function name from the lookup table. That is, an encoded function retrieving means 26 is supplied with the breakpoint setting/deleting instruction and then has access to the function name lookup table stored in the memory 22 using the original function name plus its argument(s). Thus, an encoded function name, which is specified by the original function name entered using the console 12, is retrieved from the lookup table.

The encoded function name thus obtained is applied to a breakpoint setting/deleting section 28 wherein a breakpoint is attached to the encoded function name or deleted therefrom. The breakpoint setting/deleting techniques are well known in the art and disclosed, by way of example, in a manual entitled "EWS-UX/V (Rel 4.0) Programer's Guide: Compiler System and Debugging", Chapter 5.8, pages 5–41 et seq., published 1991 by NEC corporation, and also a manual entitled "EWS-UX/V Program Development Support Tools", Section 6, published 1990 by the same entity. Thus, further descriptions of the breakpoint setting/deleting will be omitted for the sake of brevity.

The breakpoint setting section 28 is arranged to output a signal R which indicates a breakpoint netting/deleting result (viz., "Yes," or "No"). The console 12 receives the signal R by which the programmer is able to determine whether or not a breakpoint has been correctly set to (or deleted from) the encoded function name which corresponds to the function name entered via the console 12.

Although not show in FIG. 1, the breakpoint setting/deleting section 28 may be arranged such as to update the breakpoint setting/deleting in the executable file in the memory 14.

It will be understood that the above disclosure is representative of only one possible application of the present invention and that the concept on which the invention is based can be applied to a variety of arrangements/applications. Further, even though the use of a plurality of membership functions has been mentioned it will be understood that the use of a single membership is not excluded from the scope of the invention.

What is claimed is:

1. A breakpoint setting/deleting system provided in a symbolic debugger, comprising:

first means for retrieving encoded function names of overloaded functions from an executable file stored in a memory;

second means for receiving said encoded function names from said first means and for decoding said encoded function names into corresponding source-level function names and signatures thereof;

third means for receiving said encoded function names from said first means and said decoded source-level function names and signatures thereof from said second means, said third means generating a function name lookup table showing a relationship between said encoded function names and said source-level function names and signatures thereof, the function name lookup table including said encoded function names and said source-level function names and signatures thereof;

fourth means, responsive to a console, and after said function name lookup table is generated, for selecting a breakpoint setting/deleting instruction which is applied thereto from said console, the instruction including a one of said source-level function names and a signature thereof;

fifth means coupled to receive from said fourth means said breakpoint setting/deleting instruction applied from said console, said fifth means retrieving a one of said encoded function names related to said one of said source-level function names and signature thereof from said function name lookup table; and sixth means coupled to said fifth means, said sixth means setting/deleting a breakpoint to said one of said encoded function names retrieved by said fifth means.

2. A breakpoint setting/deleting system as claimed in claim 1, wherein said sixth means generates a signal which indicates a result as to whether or not a breakpoint has been set, said signal being applied to console.

3. A breakpoint setting/deleting system as claimed in claim 1, wherein said sixth means updates the breakpoint in said executable file stored in said memory.

4. A breakpoint setting/deleting system as claimed in claim 1, wherein said encoded function names are decoded by providing a prefix portion of said encoded function means of said corresponding source-level function means and providing at least a remaining suffix portion of said encoded function means as said corresponding signatures thereof.

5. A method for setting/deleting a breakpoint in a symbolic debugger, comprising the steps of:

retrieving, in a first means, and forwarding encoded function names of overloaded functions from an executable file stored in a memory;

receiving, in a second means, said encoded function names from said first means, decoding said encoded function names into corresponding source-level function names and signatures thereof, and transmitting said encoded function names, said source level function names and signatures thereof;

receiving, in a third means, said encoded function names forwarded from said first means and said source-level function names and signatures thereof transmitted from said second means, and generating a function name lookup table showing a relationship between said encoded function names and said source-level function names and signatures thereof, said function name lookup table including said encoded function names and said source-level function names and signatures thereof;

after said function name lookup table is generated, selecting and transmitting a breakpoint setting/deleting instruction which is applied from a console, the instruction including a one of said source-level function names and a signature thereof;

receiving said breakpoint setting/deleting instruction applied from said console, and retrieving and transmitting a one of said encoded function names related to said one of said source-level function names and a signature thereof from said function name lookup table; and receiving said one of said encoded function names and setting/deleting a breakpoint to said one of said encoded function names retrieved from said function name lookup table.

6. A method for setting/deleting a breakpoint as claimed in claim 5, further comprising the step of generating a signal which indicates a result as to whether or rot a breakpoint has been set, said signal being applied to said console.

7. A method for setting/deleting a breakpoint as claimed in claim 5, further comprising the step of updating the breakpoint in said executable file stored in said memory.

8. A breakpoint setting/deleting system as claimed in claim 5, wherein said encoded function names are decoded by providing a prefix portion of said encoded function means of said corresponding source-level function means and providing at least a remaining suffix portion of said encoded function means as said corresponding signatures thereof.

* * * * *